(12) United States Patent
Park et al.

(10) Patent No.: US 8,600,221 B2
(45) Date of Patent: Dec. 3, 2013

(54) WRITING/READING CONTROL METHOD OF HD STREAM

(75) Inventors: Hyun Sang Park, Seoul (KR); Woo Hyun Paik, Yongin-si (KR); Jong Seok Park, Goonpo-si (KR); Kang Suk Chai, Seoul (KR); Ssang Soo Lee, Suwon-si (KR); Jong Won Lim, Anyang-si (KR); Hyung Jin Kim, Seoul (KR); Il Gun Kwon, Seoul (KR); Bo Sung Kim, Incheon-si (KR)

(73) Assignee: LG Electronics Inc., Seoul (KR)

( * ) Notice: Subject to any disclaimer, the term of this patent is extended or adjusted under 35 U.S.C. 154(b) by 1486 days.

(21) Appl. No.: 11/077,026

(22) Filed: Mar. 11, 2005

(65) Prior Publication Data

US 2005/0201729 A1    Sep. 15, 2005

(30) Foreign Application Priority Data

Mar. 12, 2004    (KR) .................. 10-2004-0016807

(51) Int. Cl.
*H04N 5/84*    (2006.01)
(52) U.S. Cl.
USPC .......................................................... 386/335
(58) Field of Classification Search
USPC .......................................................... 386/126
See application file for complete search history.

(56) References Cited

U.S. PATENT DOCUMENTS

| 6,222,983 B1 * | 4/2001 | Heo ............................... 386/253 |
| 6,285,408 B1 * | 9/2001 | Choi et al. ....................... 348/555 |
| 7,197,088 B1 * | 3/2007 | Yukawa .......................... 375/316 |
| 2004/0033061 A1 * | 2/2004 | Hughes et al. ................ 386/124 |

FOREIGN PATENT DOCUMENTS

| JP | 2000-115701 A | 4/2000 |
| KR | 10-2000-0021153 A | 4/2000 |
| KR | 10-2002-0095797 A | 12/2002 |
| KR | 10-2002-0097453 A | 12/2002 |

* cited by examiner

*Primary Examiner* — William C Vaughn, Jr.
*Assistant Examiner* — Daniel Tekle
(74) *Attorney, Agent, or Firm* — Birch, Stewart, Kolasch & Birch, LLP

(57) ABSTRACT

The present invention provides a writing/reading control method of HD stream in a DVD recorder, by which HD broadcast signals are write in a DVD medium. The present invention includes the steps of storing a plurality of HD streams in the HDD by demodulating HD broadcast signals received from a tuner/demodulator, creating a stream file in a DVD medium to record a specific one of a plurality of the HD streams stored in the HDD, recording the specific HD stream in the stream file, opening to read the HD steam file recorded in the DVD medium, buffering the read HD stream file in the HDD, and reading the buffered HD stream file using a video decoder.

15 Claims, 9 Drawing Sheets

FIG. 3

| | Sector number (Lead-in start) |
|---|---|
| Initial zone<br>All 00h | |
| Reference code zone | 02 F000h<br>(2 ECC blocks) |
| Buffer zone 1<br>All 00h | 02 F020h<br>(30 ECC blocks) |
| Control data zone | 02 F200h<br>(192 ECC blocks) |
| Buffer zone2<br>All 00h | 02 FE00h<br>(32 ECC blocks) |
| Data Area | 03 0000h |

| Byte offset | Number of bytes | Contents | (Typical) Value | Comment |
|---|---|---|---|---|
| 0 | 4 | Content ID | 1328 4404h | |
| 4 | 14 | ID string | "LG HD-DVD Disc" | |
| 18 | 1 | Stream type | 01h | 0: SD<br>1: HD |

FIG. 6

```
Root
  |- Video_TS
  |      |- VIDEO_TS.IFO
  |      |- VIDEO_TS.VOB
  |      . . .
  |- Audio_TS
  |      |- AUDIO_PP.IFO
  |      |- AUDIO_TS.VOB
  |      . . .
  |- HD_STRM
  |      |- HD_STRM1.VOB
  |      |- HD_STRM1.IFO
  |      |- HD_STRM2.VOB
  |      |- HD_STRM2.IFO
  |      |- . . .
  |      |- HD_STRMn.VOB
  |      |- HD_STRMn.IFO
```

FIG. 7

| | Sector number (Lead-in start) |
|---|---|
| Initial zone | 02 2FA0H |
| System reserved zone | 02 D600h (192ECC blocks) |
| Buffer zone 0 All 00h | 02 E200h (32ECC blocks) |
| RW-Physical format information zone | 02 E400h (192 ECC blocks) |
| Reference code zone | 02 F000h (2 ECC blocks) |
| Buffer zone 1 All 00h | 02 F020h (30 ECC blocks) |
| Control data zone | 02 F200h (192 ECC blocks) |
| Buffer zone2 All 00h | 02 FE00h (32 ECC blocks) |
| Data Area | 03 0000h |
| : | : |

Relative sector number

| Byte offset | Number of bytes | Contents | (Typical) Value | Comment |
|---|---|---|---|---|
| 0 | 4 | Content ID | 1328 4404h | |
| 4 | 14 | ID string | "LG HD-DVD Disc" | |
| 18 | 1 | Stream type | 01h | 0: SD<br>1: HD |

WRITING/READING CONTROL METHOD OF HD STREAM

BACKGROUND OF THE INVENTION

1. Field of the Invention

The present invention relates to a disc recorder, and more particularly, to a writing/reading control method of HD stream, by which HD (high definition) streams can be wrote/read.

2. Discussion of the Related Art

Generally, a digital broadcast receiver is capable of reading a received data stream that has been stored therein or enabling real-time storage and reading of the received data stream. Such a digital broadcast receiver is shown in FIG. 1.

FIG. 1 is a block diagram of a digital broadcast receiver according to a related art.

Referring to FIG. 1, a digital broadcast receiver consists of a tuner/demodulator 2 receiving a broadcast signal from a prescribed service medium to output digital data, a stream controller 4 adjusting a transport path of a data stream from the tuner/demodulator 2, a DEMUX/MPEG (demultiplexer/Moving Pictures Experts Group) decoder 6 connected to an output end of the stream controller 4, an MPEG memory 8 connected to the DEMUX/MPEG decoder 6, RAM/CPU/ROM/user interface 12/14/16/18 connected to a system bus 10 in common, and a hard disc drive (HDD) 20 storing the data stream therein.

An operation of the digital broadcast receiver is explained as follows.

First of all, the tuner/demodulator 2 receives a broadcast signal transmitted from a service medium via an input line 1 and then converts the received broadcast signal to a digital data stream to output.

By a control of the CPU 14, the stream controller 4 stores the data stream outputted from the tuner/demodulator 2 in the HDD 20 or outputs the data stream to the DEMUX/MPEG decoder 6 for the reading. And, the stream controller 4 reads the data stream stored in the HDD 20 via the DEMUX/MPEG decoder 6.

By a control of the CPU 14, the DEMUX/MPEG decoder 6 selects the data stream inputted from the stream controller 4, temporarily stores the selected data stream in the MPEG memory 8, reads the stored data stream to decode by MPEG, and then outputs the decoded data stream via an output line 7.

The CPU 14 controls communications of the respective units or elements via the system bus 10 and performs a control operation corresponding to a user command inputted from the user interface 18. For instance, the CPU 14 changes a receiving channel of the tuner/demodulator 2 according to a user command and also changes a receiving path of the data stream in the stream controller 4.

And, the RAM (random access memory) 12 and the ROM (read only memory) 16 are used in the control operation of the CPU 14.

Thus, the related art digital broadcast receiver stores the received data stream to read or reads and stores the received data stream simultaneously, using the HDD 20. In this case, even if the received data stream generally includes several broadcast programs, a user does not view the several broadcast programs simultaneously but selects to view a specific broadcast program only.

Various digital product groups are developed and marketed as digital broadcasting has lately been put to practical use. And, products equipped with PVR (personal video recorder) function come into the market.

Since a conventional DVD-RW (digital versatile or video disc-RW) apparatus stores broadcast streams by PS (program streaming) format or stores analog outputs of decoded HD streams, it is impossible to store/read HD real-time broadcast streams without degradation of image quality.

Namely, the related art DVD, which can store the video streams, is DVD-Video or DVD-VR (video recorder) that can store SD (standard definition) streams only. In this case, the related art DVD has a capacity of about two-hour storage of DVD image quality.

However, in the related art DVD, the DVD medium can store not the currently broadcasted HD video streams but the SD video streams. Hence, the demand for storing HD video streams in DVD perpetually despite the reduction of reading time is rising.

SUMMARY OF THE INVENTION

Accordingly, the present invention is directed to a writing/reading control method of HD stream that substantially obviates one or more problems due to limitations and disadvantages of the related art.

A first object of the present invention is to provide a writing/reading control method of HD stream, by which HD streams can be stored in a DVD medium of a DVD recorder.

A second object of the present invention is to provide a writing/reading control method of HD stream, by which HD streams stored in a DVD medium can be read by a DVD recorder.

A third object of the present invention is to provide a writing/reading control method of HD stream, by which HD streams can be recoded and read according to a DVD format (VDV-Video, DVD-VR).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a DVD recorder having an HDD, an HD stream record control method according to the present invention includes the steps of selecting a record mode of a DVD medium by a user, if the record mode is an HD stream record mode, creating a stream file in the DVD medium and then recording an HD stream delivered from the HDD in the stream file, and if a stop command for the HD stream is inputted by the user, closing the currently recorded stream file, extracting stream information by examining the HD stream, and generating a stream information file to record the stream information therein.

In another aspect of the present invention, in a DVD recorder having an HDD, a writing/reading control method of HD stream includes the steps of if a DVD medium is loaded, checking a presence or non-presence of an HD stream recorded in the DVD medium, if the HD stream is recorded in the DVD medium, recognizing basic stream information to be read by searching an HD stream directory to open stream file information, opening to read an HS stream file according to the recognized basic stream information by a predetermined speed, buffering the read HD stream in the HDD, and reading the HD stream buffered in the HDD by allowing a video decoder to decode the HD stream.

In another aspect of the present invention, in a DVD recorder having an HDD, a writing/reading control method of HD stream includes the steps of storing a plurality of HD streams in the HDD by demodulating HD broadcast signals received from a tuner/demodulator, creating a stream file in a DVD medium to record a specific one of a plurality of the HD streams stored in the HDD, recording the specific HD stream in the stream file, opening to read the HD steam file recorded in the DVD medium, buffering the read HD stream file in the HDD, and reading the buffered HD stream file using a video decoder.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram of a lead-in area of a DVD-Video format of a DVD medium according to the present invention;

FIG. 6 is a diagram of a directory architecture of an HD-DVD according to an embodiment of the present invention;

FIG. 7 is a diagram of a lead-in area of a DVD-VR format of a DVD medium according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
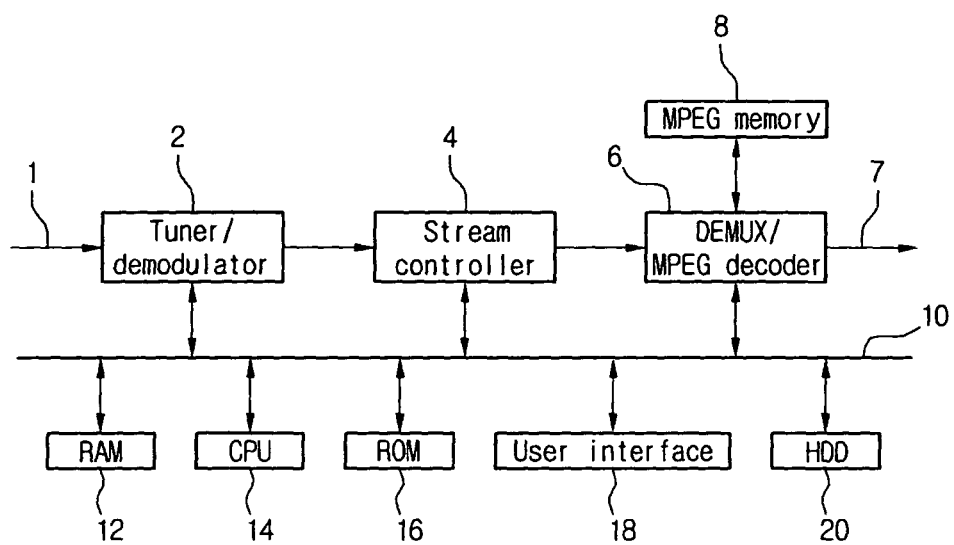
FIG. 1 is a block diagram of a digital broadcast receiver according to a related art.
Figure 2:
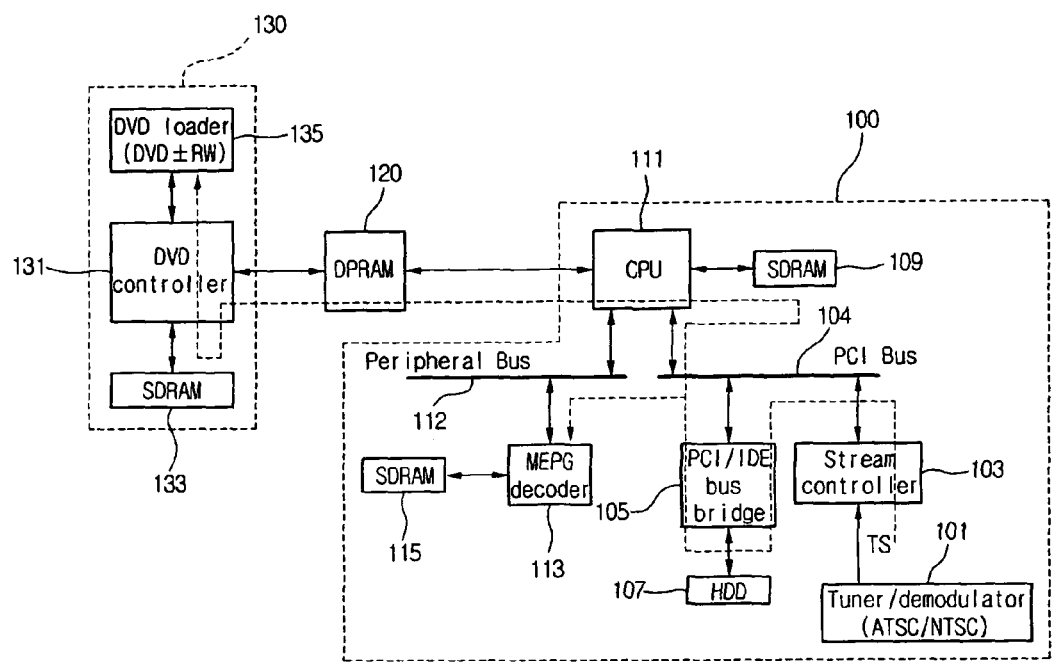
FIG. 2 is a block diagram of a writing/reading system of HD stream according to one embodiment of the present invention.

FIG. 2 is a block diagram of a writing/reading system of HD stream according to one embodiment of the present invention.

Referring to FIG. 2, a writing/reading system of HD stream according to one embodiment of the present invention includes a first module 100 having a PVR (personal video recorder) function, a second module 130 for writing/reading in/from a DVD medium, and an interface unit 120 connecting the first and second modules 100 and 130.

The first module 100 includes a tuner/demodulator 101 for channel selection and demodulation of a digital broadcast signal, a transport stream (TS) controller 103 transferring the demodulated transport stream as an encryption transport stream (ETS), a bus bridge unit 105 connected to a system bus, an HDD 107 for buffering the transport stream transferred via the bus bridge unit 105, a system memory 109 for temporarily storing the transport stream, a central processor unit 111 controlling the respective elements via the system bus, and an MPEG decoder 113 reading the transport stream, and a video memory 115 for temporary storage on stream read.

The second module 130 includes a DVD controller 131 for controlling a DVD loader (DVD±RW) 135 and a DVD memory 133 temporarily storing data wrote/read in/from the DVD medium by the DVD controller 131.

Preferably, each of the system memory 109, the video memory 115, and the DVD memory 133 includes an SDRAM (synchronous dynamic random access memory). The interface unit 120 preferably includes a DPRAM (dual-port RAM). The bus bridge unit 105 preferably includes a PCI/IDE Bus bridge. And, the system bus preferably includes a PCI (peripheral component interconnect) bus.

The above-configured writing/reading system of HD stream is explained with reference to the attached drawing as follows.

Referring to FIG. 2, the first and second modules 100 and 130 have the composite configuration. The first and second modules 100 and 130 are connected together by the interface unit 120 to transmit/receive data mutually. The composite device is operative as a DVD recorder having an HDD.

The first module 100 is a PVR module, the second module 130 is a DVD-RW (digital video or versatile disc-rewritable) module, and the interface unit 130 preferably includes DPRAM.

The tuner/demodulator 101 receives a broadcast signal via channel selection of HD digital broadcast signal and converts the received broadcast signal to digital transport stream (TS) to output.

The stream controller 103, which is connected to the system bus (PCI BUS), performs PID (packet ID) filtering of the demodulated transport stream under the control of the CPU 111 and encryption for copy prevention to accumulate the encrypted data at an internal buffer. In doing so, the encryption is not performed in real-time reading mode or encryption function stop mode.

The CPU 111 reads a predetermined quantity of stream data via the system bus 104, stores the data in the system memory 109 temporarily, and reads the stored data again to store in the HDD 107 via the bus bridge unit 105 connected to the PCI bus 104.

Since the transport stream is encrypted by the stream controller 103, contents protection for the HD stream can be provided without a separate encryption process. And, the stream data stored in the HDD 107 are stored as source data for the transport to the second module 130.

As the HD stream of terrestrial wave follows the transport stream (TS) format, buffering is needed to store the transport stream format in the DVD medium in direct. In this case, the HDD 107 is used as a buffering means. In case of being stored in the HDD 107, the transport stream format is stored in the formats of 4-byte timestamp and TS 188-byte encryption.

The HD stream stored in the HDD 107 enables real-time play via the video decoder 113. The HD stream stored in the HDD 107 can be stored as an individual broadcast program within the capacity of the HDD 107. If one broadcast program is attempted to be stored in the HDD 107 that is out of capacity, a specific broadcast program that was previously stored is erased. If a user selects 'DVD copy' through a record list stored in the HDD, it is able to copy the corresponding broadcast program to the DVD medium.

Thus, a user attempts to writing/reading the HD stream, which is stored in the HDD 107, in/from the DVD medium. For this, the CPU 111 transfers control data, which is controlled match with an interface state with the second module 130, to the DVD controller 131 of the second module 130 to record the HD stream, which is stored in the HDD 107, in another disc. Namely, the CPU 111 transfers the control data to provide an enabled state of data transfer.

Subsequently, the CPU 111 temporarily stores the stream data stored in the HDD 107 and then hands a control authority over to the DVD controller 131 of the second module 130. In doing so, the DVD controller 131 of the second module 130 reads the stream data stored in the system memory 109 of the first module 100 via the interface unit 120 and then stores the read data in the DVD memory 133 of the second module 130.

The DVD controller 131 of the second module 130 record the stream data stored in the DVD memory 133 by a predetermined speed in the DVD medium using the DVD loader (DVD±RW) 135. In this case, the data recorded in the DVD medium are the encrypted stream data of which copy is prevented.

In case of recording the HD stream in the DVD medium, information of the program is stored together. Since there exists a copy state flag of the program, it is able to put in the information of 'Copy Never', 'Copy Once' and the like.

Moreover, in the DVD medium, prescribed information is recorded to identify that HD stream is stored therein. Namely, the DVD medium is divided into record information, reading information, and data areas of the HD stream. A title, language, time, file size and the like of the HD stream are recorded in the record information area. And, reading address, equipment information and the like are included in the reading information area.

The interface unit 130 connecting the first and second modules 100 and 130 together includes a DPRAM. The interface unit 130 minimizes a transport time of the data transferred between the first and second modules 100 and 130 via buffering and enables real-time data transmission/reception.

For fast data transport between two processors (CPU, DVD controller), the interface unit 130 divides a dual port RAM area into two channels to use as a data transport channel and a data transport control channel, respectively. Separate transport protocol data is not added in the data transport channel to increase data transport efficiency. Instead, size information by block unit is included to be transferred. And, data transport channel control information is transmitted over the data transport control channel.

Meanwhile, the HD stream stored in the DVD medium of the second module 130 is readed in a reverse sequence of the above-explained one. Namely, the DVD controller 131 of the second module 130 stores the data, which is temporarily stored in the DVD memory 133 and is stored in the DVD memory 133 by the CPU 111, in the system memory 109, stores them in the HDD 107. The data are decrypted by the stream controller 103. And, the decrypted data are decoded by the video decoder 113 to be read. In doing so, the video decoder 113 is an MPEG decoder.

The usable authority of the DPRAM as the interface unit connecting the PVR and DVD modules is given to the CPU 111 of the PVR module or the DVD controller 131 of the DVD-RW module according to whether the system is in reading or writing mode.

As another embodiment, the received transport stream data is stored in the HDD 107, and simultaneously, can proceed to the MPEG decoder 113 in a mode enabling real-time play. In this mode, the encryption process of the stream controller is skipped.

The above-explained writing/reading control system of HD stream specifies a format to store the HD stream in the DVD medium and performs recording and playback according to the specified format. For instance, since the DVD formats used as the record format of the current DVD medium are DVD-video and DVD-VR (DVD-Video Recording), it is able to store the HD stream in the disc of the two formats.

First of all, the DVD-video format of the present invention is explained as follows.

The disc structure for recording HD stream in the DVD-Video format is shown in FIGS. 3 to 6.

Figures 4, 5:
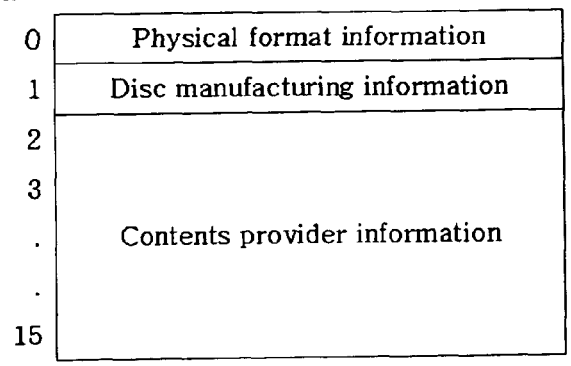
FIG. 4 is a configurational diagram of a control data area in FIG. 3.
FIG. 5 is a configurational diagram of a contents provider information area in FIG. 4.

FIG. 3 is a diagram of a lead-in area of a DVD-Video format of a DVD medium according to the present invention, FIG. 4 is a configurational diagram of a control data area in FIG. 3, FIG. 5 is a configurational diagram of a contents provider information area in FIG. 4, and FIG. 6 is a diagram of a directory architecture of an HD-DVD according to an embodiment of the present invention.

Referring to FIG. 3, a lead-in area of a DVD-Video includes an initial zone, a reference code zone, a buffer zone-1, a control data zone, a buffer zone-2, a data area and the like. And, they are identified by sector numbers, respectively.

The control data zone has the block configuration of a control data block shown in FIG. 4. Control data, as shown in FIG. 4, includes a physical format information area, a disc manufacturing information area, and a contents provider information area.

A maximum data rate of a disc, e.g., information specified as '0011b' is recorded in the physical format information area, which means 20.16 Mbps. The contents provider information area, which is defined as HD-DVD ID table shown in FIG. 5, is configured to identify whether the disc contains an HD format (0: SD, 1: HD).

The HD-DVD ID table, as shown in FIG. 5, includes byte offset, number of bytes, contents, value, and comment. The contents include contents ID, ID string, and stream type. And, the comment indicates SD or HD.

Moreover, an HD DVD has a directory structure shown in FIG. 6, in which an HD stream directory is added to a conventional DVD.

Namely, the directory is divided into at least three folders Video TS, Audio TS, and HD STREAM beneath a root. And, corresponding files are stored in each of the folders. Moreover, the HD STREAM file is generated in a manner of forming at least one pair of reading and information files HD_STREAM.VOB and HD_STREAM.IFO.

HD stream data are stored in the HD_STREAM.VOB file to be substantially read the HD_STREAM.INF file contains title menu and connection information to the HD stream data.

Meanwhile, the DVD-VR format is explained with reference to FIGS. 7 to 9 as follows.

Figures 8, 9:
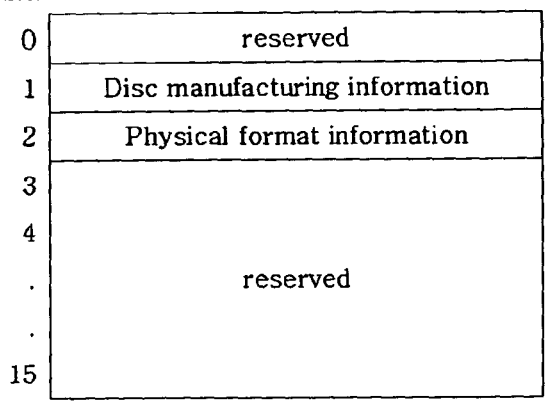
FIG. 8 is a configurational diagram of a control data area in FIG. 7.
FIG. 9 is a configurational diagram of a contents provider information area in FIG. 8.

FIG. 7 is a diagram of a lead-in area of a DVD-VR format of a DVD medium according to the present invention, FIG. 8 is a configurational diagram of a control data area in FIG. 7, and FIG. 9 is a configurational diagram of a contents provider information area in FIG. 8.

Referring to FIG. 7, a lead-in area of a DVD-VR includes an initial zone, a system reserved zone, a buffer zone-0, an RW physical format disc zone, a reference code zone, a buffer zone-1, a control data zone, a buffer zone-2, and a data area. And, they are identified by sector numbers, respectively.

The control data zone has the block configuration of an RW-physical format information block shown in FIG. 8. The RW physical format information structure, as shown in FIG. 8, includes a reserved area, a disc manufacturing information area, a physical format information area, and another reserved area. And, they are identified by relative sector numbers, respectively.

A maximum data rate of a disc, e.g., information specified as '0011b' is recorded in the physical format information area, which means 20.16 Mbps. The reserved are, which is defined as HD-DVD ID table shown in FIG. 9, is configured to identify whether the disc contains an HD format (0: SD, 1: HD).

The HD-DVD ID table, as shown in FIG. 9, includes byte offset, number of bytes, contents, value, and comment. The contents include contents ID, ID string, and stream type. And, the comment indicates SD or HD.

Moreover, an HD DVD has a directory structure shown in FIG. 6, in which an HD stream directory is added to a conventional DVD. Namely, the directory is divided into at least three folders Video TS, Audio TS, and HD STREAM beneath a root. And, corresponding files are stored in each of the folders.

Figure 10:
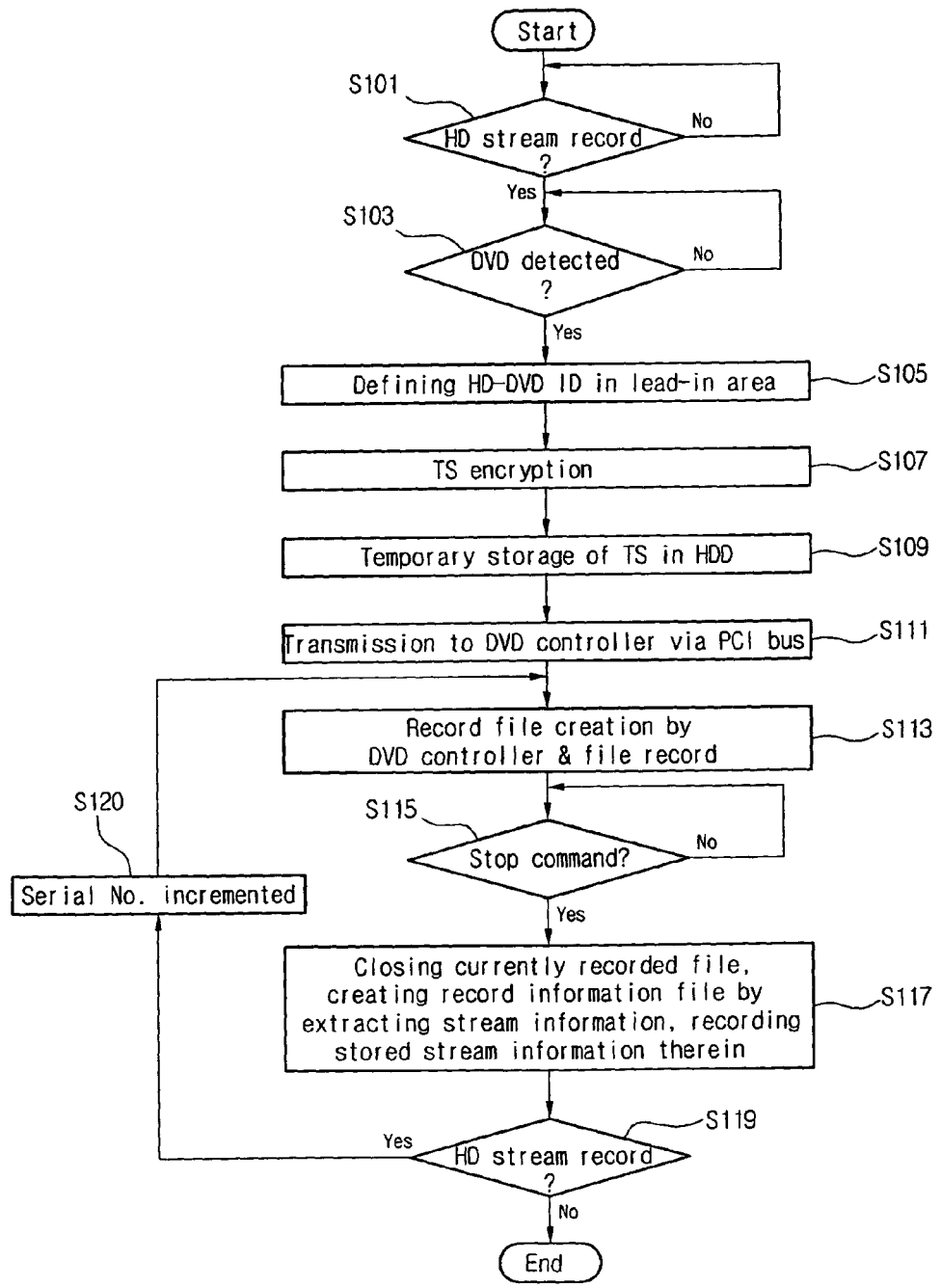
FIG. 10 is a flowchart of a record control method of HD stream data according to an embodiment of the present invention.

FIG. 10 is a flowchart of a record control method of HD stream data according to an embodiment of the present invention, which is explained with reference to the system of FIG. 2 as follows.

Referring to FIG. 10, it is checked whether a user selected an HD record option (S101). If the user selected the option, it is detected whether a DVD is loaded (S103). If the DVD is loaded, an HD-DVD ID is recorded in a lead-in area to indicate that the DVD is a disc storing HD stream therein (S105).

The stream controller performs PID (packet ID) filtering and encryption on the transport stream, for which a channel was selected to be demodulated by the tuber/modulator (S107). In doing so, the encryption is performed for copy prevention.

The encrypted transport stream is buffered in the HDD (S109). The transport stream data stored in the HDD are read in their stored sequence by the CPU via the PCI and are then delivered to the DVD controller of the second module via the DPRAM (S111).

In doing so, the DVD controller temporarily stores the data entering the DVD memory and generates a record file (e.g., HD_STRM1.VOB) on the DVD to record the stream data, which are stored in the DVD memory, in the file (S113).

Subsequently, it is checked whether a stop command from a user exists (S115). If there exists the stop command, the file (i.e., HD_STRM1.VOB) that is being recorded is closed. After stream information is extracted by examining the recorded stream, record information file (e.g., HD_INFO1.IFO) is generated to record various information (bit rate, time, channel information, etc.) for the record file (HD_STRM1.VOB) (S117).

In this case, the record file and the record information file are recorded for one record stream that is identified from other record streams by a serial number.

Thereafter, if a user records a different content in the current disc (S119), a serial number of a record file (e.g., HDSTRM2.VOB) is incremented (S120) and the step S113 is iterated.

Figure 11:
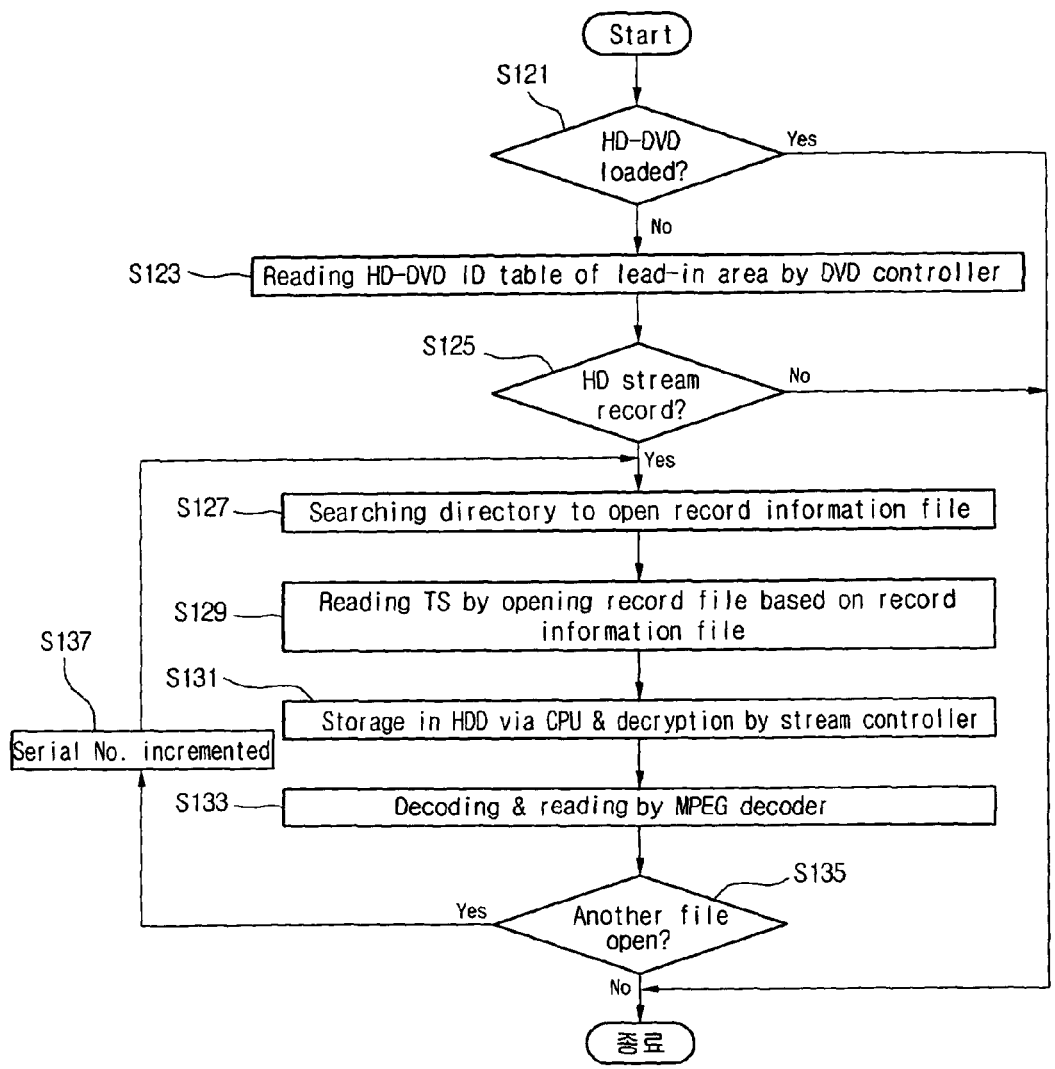
FIG. 11 is a flowchart of a reading control method of HD stream data according to an embodiment of the present invention.

FIG. 11 shows a flowchart of a reading control method of HD stream data recorded on a DVD medium according to an embodiment of the present invention.

Referring to FIG. 11, once an HD-DVD is loaded (S121), the DVD controller reads HD-DVD ID table of a lead-in area of the DVD (S123).

It is checked whether HD stream is in reading mode (S125). If the HD stream is in reading mode, a directory having the HD stream recorded therein is searched to open a record information file (S127).

After basic information of the HD stream recorded in the record information file has been extracted, a corresponding record file (HD_STRM1.VOB) is opened to read by a predetermined speed (S129).

The CPU receives the HD stream read by the DVD controller via the DPRAM, stores to buffer the received HD stream in the HDD, and then reads the buffered HD stream to deliver to the stream controller. The stream controller decrypts the HD stream and the MPEG decoder decodes the decrypted HD stream to perform the video play (S131, S133).

Thereafter, in case of attempting to open another file (S135), a serial number of the file is incremented (S137) and the above steps are repeated for play.

As explained in the foregoing description of the writing/reading control method of HD stream according to the present invention, the HD broadcast stream is recorded in the DVD medium of the DVD recorder by real time or the broadcast program stored in the HDD is selectively recorded. Hence, it is able to store a specific broadcast program using the DVD medium.

And, the present invention recognizes to read the broadcast program recorded in the DVD medium, thereby overcoming the storage limit of the conventional DVD-RW and thereby implementing stable data transmission/reception via the buffering using the HDD.

Moreover, the present invention enables fast data transmission/reception with the DVD-RW module using the DPRAM, thereby minimizing the delay time due to buffering and thereby securing real-time data transport.

Furthermore, the present invention enables the writing and reading of the HD broadcast programs for the DVD-Video or DVD VR disc format.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of recording a video stream in an optical disc, wherein the optical disc has a first folder for storing video streams with a first resolution, a second folder for storing audio streams, and a third folder for storing video streams with a second resolution, and
wherein the second resolution is higher than the first resolution,
the method comprising:
receiving a selection signal for selecting a video file with the second resolution that is stored in an HDD (hard disc drive);
recording, in a control data zone of a lead-in area of the optical disc, stream type information for indicating the first or second resolution, wherein the stream type information is set to information indicating the second resolution;
generating, from the video file with the second resolution, a data set including a video stream reading file with the second resolution and a video stream information file corresponding to the video stream reading file; and
recording the data set in the third folder, wherein the data set has a serial number which is larger than a serial number of a previously-recorded video stream reading file and video stream information file data set.

2. The method of claim 1, wherein the video file with the second resolution stored in the HDD is a transport stream with the second resolution received in real time via a broadcast.

3. The method of claim 1, wherein the video file with the second resolution stored in the HDD is one of a plurality of broadcast programs previously stored in the HDD.

4. The method of claim 1, wherein the video file with the second resolution stored in the HDD is encrypted.

5. The method of claim 1, wherein the video stream reading file recorded in the optical disc is encrypted.

6. The method of claim 5, further comprising:
reading and decrypting the encrypted video stream reading file.

7. The method of claim 1, wherein the video stream information file includes a bit rate, time, and channel information of the video stream reading file.

8. The method of claim 1, further comprising:
generating another video stream reading file and video stream information file data set, the another data set having a corresponding serial number formed by incrementing the serial number of the data set generated from the video file with the second resolution; and
recording the another data set in the third folder.

9. The method of claim 1, wherein the optical disc is formatted as a DVD-Video format.

10. The method of claim 1, wherein the optical disc is formatted as a DVD-VR (DVD-video recording) format.

11. The method of claim 1, wherein the first resolution is high definition and the second resolution is standard definition, and the optical disc is a DVD medium.

12. A method of reproducing an HD (high definition) stream recorded in an optical disc,
wherein the optical disc has a first folder for storing video streams with a first resolution, a second folder for storing audio streams, and a third folder for storing video streams with a second resolution, and
wherein the second resolution is higher than the first resolution,
the method comprising:
reading, from a control data zone of a lead-in area of the optical disc, stream type information for indicating the first or second resolution;
checking whether or not a video stream with the second resolution is recorded in the optical disc, based on the stream type information;
if the checking step indicates that the video stream with the second resolution is recorded in the optical disc, reading a video stream reading file with the second resolution and a video stream information file corresponding to the video stream reading file from the third folder, to buffer the video stream with the second resolution in an HDD (hard disc drive);
decoding the video stream with the second resolution written in the HDD; and
outputting the decoded video stream with the second resolution,
wherein a pair of the video stream reading file and the video stream information file read from the third folder have a serial number which is larger than a serial number of a previously-recorded pair of a video stream reading file and a video stream information file.

13. The method of claim 12, further comprising:
if the video stream with the second resolution buffered in the HDD is an encrypted stream, decrypting the encrypted stream.

14. The method of claim 12, in a video stream transport path from the optical disc to the HDD, the method further comprising:
allowing a controller to read the video stream recorded in the optical disc to store the read video stream in a memory; and
allowing a CPU (central processing unit) to read the video stream stored in the memory via an interface unit to store the video stream read from the the memory in the HDD.

15. The method of claim 12, wherein the first resolution is high definition and the second resolution is standard definition, and the optical disc is a DVD medium.

* * * * *